United States Patent [19]

Styron

[11] 4,226,630
[45] Oct. 7, 1980

[54] LEACH-RESISTANT SOLID BODIES FROM FLY ASH AND HEAVY METAL SLUDGE

[75] Inventor: Robert W. Styron, Marietta, Ga.

[73] Assignee: Amax Resource Recovery Systems, Inc., Atlanta, Ga.

[21] Appl. No.: 26,492

[22] Filed: Apr. 3, 1979

[51] Int. Cl.³ ............................................. C04B 7/28
[52] U.S. Cl. .............................. 106/85; 106/DIG. 1
[58] Field of Search .................... 106/DIG. 1, 109, 85

[56] References Cited

U.S. PATENT DOCUMENTS

| 3,785,840 | 1/1974 | Minnich et al. | 106/DIG. 1 |
| 3,859,799 | 1/1975 | Jaco | 106/DIG. 1 |
| 4,028,130 | 6/1977 | Webster | 106/DIG. 1 |
| 4,116,705 | 9/1978 | Chappell | 106/DIG. 1 |

Primary Examiner—James Poer
Attorney, Agent, or Firm—Michael A. Ciomek; Donald T. Black

[57] ABSTRACT

Solid, leach-resistant bodies are formed from aqueous heavy metal sludge and fly ash formed in the combustion of subbituminous coal from the Power River Basin by slurrying the sludge with an amount of fly ash equivalent to between about 20 wt. % and about 70 wt. % based on the weight of the slurry, wherein the initial liquid content of the slurry is such that the slurry will harden into a body having a 7-day compressive strength of at least about 250 psi, and allowing the slurry to harden.

16 Claims, No Drawings

LEACH-RESISTANT SOLID BODIES FROM FLY ASH AND HEAVY METAL SLUDGE

BACKGROUND OF THE INVENTION

1. Field of the Invention

This invention relates to waste disposal, and to the disposal in particular of fly ash, produced in the burning of coal, and of aqueous sludges containing heavy metal species such as tungsten, cadmium, chromium, strontium, copper, iron, lead, nickel, zinc, molybdenum, tin, magnesium, aluminum, phosphorus, and manganese. The sludges also usually contain other inorganic ions such as alkali metal and alkaline earth cations and inorganic anions such as oxides, hydroxides, carbonates, silicates, sulfides and basic sulfates.

Fly ash comprises finely divided inorganic products of the combustion of coal. Enormous amounts of fly ash are produced annually nationwide, principally from burning coal in, for instance, power plants. Disposal of these amounts of fly ash poses an increasingly difficult problem because the volume, the particulate nature and the varied chemical composition of fly ash limit the number of acceptable disposal sites. Furthermore the capacity of acceptable disposal sites is not unlimited. It is desirable to be able to convert fly ash economically into a usable product rather than merely discarding it, but up to now it has been necessary to incur the cost of another product, such as cement, to combine with the fly ash as a binder.

Water-borne heavy metal sludges produced in plants which process or refine metals also present disposal problems. Environmental considerations limit the number of areas in which the sludges per se can be disposed of, principally because of the risk that the heavy metals in the sludge will leach out into the surrounding soils and will be carried into surface and subsurface waters. For this reason, conventional landfills are no longer acceptable. There is, therefore, a need for a technique that can immobilize or fix the heavy metals in the sludges in a useful, long-lasting product which presents a minimal risk that the heavy metal species will subsequently leach out of the product into the surrounding environment. The present invention is a technique which accomplishes this desired goal while simultaneously achieving the desired goal of permitting the conversion of coal fly ash into a useful product.

3. Description of the Prior Art

Fly ash of particular composition has been used as an additive in Portland cement, but the fly ash has not itself been hydraulic (i.e. self-setting). Rather, the purpose of adding the fly ash has been to strengthen the cement, evidently by reacting with excess free lime and by reacting with sulfate compounds which would otherwise attack the tricalcium aluminate and tetracalcium aluminoferrite compounds of Portland cement.

While heavy metal wastes have been disposed of in solids formed by compounding the wastes with commercial Portland cement, this approach is undesirable because it is expensive in its consumption of cement.

Several techniques purporting to permit the fixation of wastes into stable products which are safe for disposal are commercially available, but are not believed to offer the range of applicability nor the economies of operation available in the present invention. In each of these techniques, sludge is mixed with other ingredients and the mixture is compacted to a given density to form a dense body. One such technique, known as "Chemfix" (sold through Chemfix, Inc.), uses a combination of sodium silicates and silicate cement setting agents which react with polyvalent metal ions to form a cross-linked structure which holds the metal ions. In two other techniques, the reactions by which heavy metal species are fixed in the compacted body occur very slowly, e.g. on the order of 60 days. Another technique employs a proprietary reagent known as "Calcilox" (sold through Dravo Corp.) which is added together with large amounts of lime to the sludges under treatment. A third technique, termed "Pozotec" (sold through I.U. Conversion Systems, Inc.) forms a compacted product from a combination of fly ash, lime, and sulfate sludge from sulfur dioxide scrubbing units.

The present invention is preferable to each of these techniques because it can be carried out quickly; a solid body in which the heavy metal species are fixed is formed in a matter of minutes. Also, the present invention uses only the waste materials, namely fly ash and metal sludges, and thus does not require the addition of other reagents which would add to the expense and the complexity of the waste disposal operation.

SUMMARY OF THE INVENTION

Stated generally, the invention comprises a process of treating an aqueous sludge containing liquid and at least one heavy metal species selected from the group consisting of tungsten, cadmium, chromium, strontium, copper, iron, lead, nickel, zinc, molybdenum, tin, magnesium, aluminum, phosphorus and manganese, to form a solid leach-resistant body, comprising adding to said sludge fly ash formed in the combustion of sub-bituminous coal from the Powder River Basin in an amount effective to form a slurry which will harden into a solid, leach-resistant body, and adjusting the initial liquid content of the slurry to a value such that the body will have a 7-day compressive strength of at least about 250 psi, and allowing the slurry to harden. The present invention also comprises products of the process herein described and claimed.

DETAILED DESCRIPTION OF THE INVENTION

The present invention is a method for treating heavy metal sludges using fly ash. It has been found that the fly ash produced in the combustion of sub-bituminous coal from the Powder River Basin forms hard, stable products on the addition of water, and that heavy metal sludges can be fixed very satisfactorily in the hardened products when the sludges are added under certain conditions to this fly ash. The Powder River Basin coal deposits occur in a well-defined region of northern Wyoming and southern Montana. The coal which is mined from these deposits is sub-bituminous, i.e. coal of rank intermediate between bituminous and lignite having caloric values in the range of 8,300 and 13,000 BTU per pound (calculated on a moist, mineral-matter-free basis). Coal is currently being mined from fields in the Powder River Basin deposits, for instance, in the vicinity of Gillette, Wyo., by the Amax Coal Company. This coal is typically pulverized and burned, for instance, in power plants. Fly ash is formed and recovered, frequently with the use of electrostatic precipitators in the power plant smokestacks. When added to water, the fly ash sets in a matter of several minutes to a dense solid.

The fly ash which is appropriate for use in the process and products of the present invention may typically show the following components on analysis:

Table 1

| Components | Proportion |
|---|---|
| SiO$_2$ | 20-40 wt. % |
| Al$_2$O$_3$ | 10-30 |
| Fe$_2$O$_3$ | 3-10 |
| MgO | .5-8 |
| SO$_3$ | 1-8 |
| TiO$_2$ | .5-2 |
| C | .5-2 |
| H$_2$O | .33-3 |
| CaO | 10-32 |
| K$_2$O | .5-4 |
| Na$_2$O | .5-6 |

The mineralogy of the fly ash will typically be as follows:

Table 2

| Fraction | Peak Height, X-Ray Analysis |
|---|---|
| Quartz | 10-28 |
| Hematite | 1-6 |
| Periclase | 1-6 |
| Calcium Oxide | 1-10 |

The fineness of the fly ash will ordinarily be such that less than about 34% is retained on a 325 mesh sieve (U.S. Series) as tested on ASTM Test Proc. C-311 ("Sampling and Testing Procedures for Fly Ash as a Mineral Admixture for Portland Cement Concrete"). The fly ash is preferably recovered and used dry because of its hydraulic (i.e. self-setting) nature.

The present invention is applicable to the fixation of heavy metal species, including solid and water-borne wastes containing heavy metals. The invention is particularly applicable to aqueous sludges which contain heavy metal species and which are produced as waste streams from plants which process or refine metals, such as zinc refineries and lead smelters. More specifically, sludges can be formed as the waste products of milling operations, leaching circuits, electrowinning tankhouse wastes, and filter cakes obtained at various processing stages. Such sludges are frequently recovered from filter presses or drums, or from the bottom of settling tanks, and typically have pH values from about 3 to about 12. The treatment of heavy metal sludges produced in metal refining operations constitutes a preferred embodiment of this invention, and the invention will be described in greater detail with reference to this embodiment.

The heavy metal species which it is desired to fix by the process of the present invention include tungsten, cadmium, chromium, strontium, copper, iron, lead, nickel, zinc, molybdenum, tin, magnesium, aluminum, phosphorus, and manganese. The heavy metal species can be present as, for example, slimed oxidic or sulfidic particles having a size distribution such that typically 20% are minus 200 mesh (U.S. Screen Series). The metal species are principally insoluble but may to some extent be dissolved (as e.g. cations or oxyanions) in the accompanying liquid, and the present invention is intended to cover treatment of the liquid, as well as the solid portion of the sludge. For instance, a typical sludge from a zinc refinery has a pH of about 3 to about 7, with the following composition:

Table 3

| Component | Amount |
|---|---|
| SiO$_2$ | 1-5 wt. % |
| Al$_2$O$_3$ | 1-3 |
| Fe$_2$O$_3$ | 1-5 |
| MgO | 1-10 |
| SO$_3$ | 10-50 |
| TiO$_2$ | 0.1-0.5 |
| K$_2$O | 0.1-0.5 |
| ZnO | 10-20 |
| CaO | 20-40 |

A typical sludge discarded from a molybdenum processing operation has a pH of about 3 to about 7, with the following composition:

Table 4

| Components | Amount |
|---|---|
| SiO$_2$ | 1-5 |
| Al$_2$O$_3$ | 1-5 |
| Fe$_2$O$_3$ | 1-5 |
| MgO | 1-4 |
| SO$_3$ | 5-50 |
| CaO | 5-50 |
| TiO$_2$ | 0.1-0.5 |
| K$_2$O | 0.1-1.0 |
| MoO$_3$ | 0.1-10 |

The sludges will typically take the form of a thick paste or cloudy suspension, but a supernatant layer of liquid may form over the solid components of the sludge on standing for a length of time. Since the present invention is preferably carried out using both the solid and liquid components of the sludge, it is preferred that the sludge be stirred or shaken prior to addition of the fly ash to ensure uniform distribution throughout the solids of the heavy metal species dissolved in the liquid.

It has been determined that a durable, leach-resistant solid body may be formed from dry fly ash, formed in the combustion of Powder River Basin subbituminous coal as described above, and a heavy metal sludge, by adding sufficient fly ash to the sludge to form a slurry. The relative amounts of fly ash and sludge necessary to reach the indicated pH will depend upon the nature and constituents of the sludge, but generally speaking the amount of fly ash added corresponds to between about 10 wt.% and about 70 wt.% fly ash based on the weight of the slurry (fly ash plus sludge). Preferably, the amount of the fly ash is between about 40 wt.% and about 60 wt.% of the weight of the slurry. The pH of the slurry will be between about 4 and about 7.

The fly ash and the sludge should be mixed or stirred together quickly as thoroughly as feasible, and then the mixing should be discontinued and the slurry allowed to set. The mixing can be accomplished by means well-known in the art.

When the fly ash and sludge are combined in the indicated manner, the water contained in the sludge will wet the fly ash, which will begin to harden in normally a few minutes. The slurry will eventually set to a solid, dense body which has high compressive strength. The high density and strength help to resist the penetration of water into the interior of the body, and thus protect against leaching out of the heavy metal species. In addition, the heavy metals are believed to be fixed within the solid body and are, therefore, resistant to leaching action. Quantitative measures of the resistance to leaching are set forth below.

While some water must be present in the slurry to allow the fly ash to set properly, the water content of the slurry should be controlled so that the slurry will set to a body having the desired compressive strength. It has been found that the compressive strength is increased as the set time is decreased, and that the set time increases with decreasing liquid content of the slurry.

Thus, the liquid content of the slurry should be adjusted to achieve the desired compressive strength in the solid body. The most practical way of adjusting the liquid content of the slurry is to adjust the liquid content of the heavy metal sludge, for instance, by adding water to the sludge or by withdrawing supernatant liquid from the sludge. Since the slurry can start to harden quickly, adding or withdrawing water to or from the slurry is impractical. However, if necessary, water can be added to the slurry while the slurry is being stirred.

The hardened body should have a 7-day compressive strength of at least about 250 psi, and a 28-day compressive strength of at least about 400 psi. In order to achieve the desired 7-day compressive strength in the hardened body, the liquid content of the slurry should be between about 10% and about 50% of the total weight of solid plus liquid (i.e. sludge plus fly ash). The slurry will usually have a heavy, pasty consistency although more liquid can be added if it is desired to be able to pour the slurry into a container or a mold. Preferably, the 7-day compressive strength of the solid body should be at least about 1500 psi, and as high as 2500 psi or above. The 28-day compressive strength of the hardened body will typically be at least about 1500 psi, and is preferably above about 2500 psi and as high as 3500 psi or above. The corresponding liquid content of the slurry is preferably between about 10% and about 30%, and more preferably, between about 10% and about 20%.

When the fly ash is mixed with sludge containing sufficient liquid to reach the desired strength in the solidified body, the slurry will normally begin to set in times on the order of 5 minutes to several hours. For some applications, such as the preparation of particularly large forms, it may be desirable to add a set-retarding agent, such as one of the lignin sulfate compounds familiar to those skilled in this art, e.g. "Pozzolith 344R," sold by Master Builders, Inc., Cleveland, Ohio, or "Duretard," sold through W. R. Grace, Inc., New York, N.Y. It is also possible to accelerate the set time of a slurry, and thereby increase its 28-day compressive strength, by subjecting the slurry to steam curing by techniques familiar to those skilled in this art. The rate of setting is also a function of the temperature of the slurry, with higher temperatures resulting in shorter set times and higher compressive strengths. At a minimum, the temperature should be above about 40° F., and the temperature may, as indicated, exceed 212° F., such as in steam curing in which the temperature usually ranges as high as about 250° F. The slurrying may be carried out at ambient temperatures (60° F.–80° F.) with satisfactory results.

The present invention is most suitably used to prepare relatively large forms, e.g. objects on the order of about 4 feet by about 8 feet by about 6 inches thick such as blocks, panels, structural members, slabs, and paving. The resistance of a hardened body formed by the present invention to leaching of the contained heavy metal species can be increased by protective layers on the surface of the body, such as paint, Portland cement or concrete.

In general, the hardened body formed in accordance with the present invention has a density of at least about 50 pounds per cubic foot; densities of this magnitude indicate that for most purposes the heavy metals fixed in the body will be subject to leaching only as the solid body is itself subject to breakdown or degradation. Thus, the solid body should not be crushed or ground up, and it preferably should not be exposed to violent or corrosive stresses or environments.

To further minimize the chance that the heavy metal species may in the future leach out of the hardened fly ash-sludge body of the present invention, it is preferred that the fly ash and sludge contain a minimum of oxidizable components which might in the future cause internal leaching reactions. Since the fly ash as used is substantially entirely oxidized, this object is met practically by requiring that the sludge preferably contain no more than about 50 wt.% sulfides.

The invention will be further described in the nonlimiting Examples. The leachability test used in the Examples is carried out as follows: Cubes of hardened material 2 inches on a side are submerged in deionized water, and the cubes and water are shaken continuously for 24 hours. The water is then removed and analyzed for trace metals.

EXAMPLE 1

Sludge was obtained from a molybdenum processing operation and was found to have the following analysis:

| Component | Amount (wt. %) | Component | Amount (wt. %) |
|---|---|---|---|
| $SiO_2$ | 2.42 | $SO_3$ | 37.79 |
| $Al_2O_3$ | 2.36 | $CaO$ | 36.73 |
| $Fe_2O_3$ | 2.14 | $TiO_2$ | 0.20 |
| $MgO$ | 1.82 | $MoO_3$ | 0.65 |

The sludge was 29% solids by weight and 81% liquid (water plus dissolved species) by weight. 400 grams of sludge were thoroughly mixed at 70° F. with 600 grams of fly ash which had the following composition:

| Component | Amount (wt. %) | Component | Amount (wt. %) |
|---|---|---|---|
| $SiO_2$ | 34.48 | $CaO$ | 30.24 |
| $Al_2O_3$ | 21.98 | $TiO_2$ | 1.20 |
| $Fe_2O_3$ | 5.95 | $H_2O$ | 0.01 |
| $SO_3$ | 2.50 | $MgO$ | 1.38 |

The hardening slurry was placed into a cubic mold 2 inches on a side. The increase in compressive strength was as follows:

| Time | Compressive Strength |
|---|---|
| 1 day | 125 psi |
| 7 days | 250 psi |
| 28 days | 401 psi |

After 3 days the cube was subjected to the leaching test described above using distilled water at a pH of 7.0. The leachate obtained after 24 hours was found to have the dissolved components and amounts set forth in Table A, (under "Leachable as Fixed" ND—None Determined).

The sludge as received was analyzed for leachable metals as follows: 700 grams of sludge was mixed with 2.8 liters of distilled water and shaken for 24 hours. The supernatant was then drawn off and analyzed, and the amounts are listed under "Leachable as Received."

TABLE A

| Component | Leachable As Received | Leachable as Fixed |
|---|---|---|
| Iron | 0.4–20.0 ppm* | ND |
| Molybdenum | 0.2–0.4 ppm | ND |
| Copper | 0.4–2.0 ppm | 0.02–0.2 ppm |
| Aluminum | 0.4–4.0 ppm | 0.1–1.0 ppm |
| Strontium | 4–40 ppm | ND |
| Chromium | ND | 0.05–0.10 ppm |
| Silver | 0.05 ppm | ND |

*ppm = parts per million.
*Sludge leachate is from leaching a sample of the same sludge used for making cubes.

EXAMPLE 2

Sludge was collected from a zinc refinery and was found to have the following analysis:

| Component | Amount (wt. %) | Component | Amount (wt. %) |
|---|---|---|---|
| $SiO_2$ | 0.12 | $K_2O$ | 0.01 |
| $Al_2O_3$ | 1.33 | ZnO | 17.92 |
| $Fe_2O_3$ | 1.92 | $SO_3$ | 38.50 |
| CaO | 23.48 | $Na_2O$ | 0.12 |
| $TiO_2$ | 0.18 | loss on ign. | 7.65 |
| | | $H_2O$ | 6.22 |

The sludge was 22% solids by weight and 78% liquid (water plus dissolved species) by weight. 600 grams of sludge were thoroughly mixed at 70° F. with 400 grams of fly ash which had the following composition:

| Component | Amount (wt. %) | Component | Amount (wt. %) |
|---|---|---|---|
| $SiO_2$ | 34.48 | CaO | 30.24 |
| $Al_2O_3$ | 21.98 | $TiO_2$ | 1.20 |
| $Fe_2O_3$ | 5.95 | $H_2O$ | 0.01 |
| $SO_3$ | 2.50 | MgO | 1.38 |

The resulting slurry began to set almost immediately. The slurry was placed into a cubic mold 2 inches on a side and allowed to set into a cube. The increase in compressive strength was as follows:

| Time | Compressive Strength |
|---|---|
| 1 day | 225 psi |
| 7 days | 490 psi |
| 28 days | 1200 psi |

After 3 days the cube was subjected to the leaching test described above using distilled water at a pH of 5.5. The leachate obtained after 24 hours was found to have the dissolved components and concentrations set forth in Table B, under "Leachable as Fixed" (ND=None Determined).

The sludge as received was analyzed for leachable metals as follows: 700 grams of sludge was mixed with 2.8 liters of distilled water and shaken for 24 hours. The supernatant was then drawn off and analyzed, and the amounts are listed under "Leachable as Received."

TABLE B

| Component | Leachable as Received | Leachable as Fixed |
|---|---|---|
| Boron | 3–16 ppm | ND |
| Phosphorous | 0.3–1.6 ppm | ND |
| Magnesium | 30–160 ppm | 0.01–.02 ppm |
| Iron | 3–16 ppm | ND |
| Copper | 3–16 ppm | ND |

TABLE B-continued

| Component | Leachable as Received | Leachable as Fixed |
|---|---|---|
| Zinc | 0.3–3.0 ppm | 0.01–.001 ppm |
| Aluminum | 3–16 ppm | ND |
| Manganese | 0.03–3.0 ppm | ND |
| Strontium | 16–30 ppm | ND |

EXAMPLE 3

Sludge was collected from a zinc refinery and was found to have the following analysis:

| Component | Amount (wt. %) | Component | Amount (wt. %) |
|---|---|---|---|
| $SiO_2$ | 63.88 | $K_2O$ | 0.58 |
| $Al_2O_3$ | 13.23 | $MoO_3$ | 0.65 |
| $Fe_2O_3$ | 17.87 | $SO_3$ | 0.05 |
| CaO | 4.27 | $Na_2O$ | 0.07 |
| $TiO_2$ | 0.28 | | |

The sludge was 31% solids by weight and 69% liquid (water plus dissolved species) by weight. 350 grams of sludge were thoroughly mixed at 70° F. with 650 grams of fly ash which had the following composition:

| Component | Amount (wt. %) | Component | Amount (wt. %) |
|---|---|---|---|
| $SiO_2$ | 34.48 | CaO | 30.24 |
| $Al_2O_3$ | 21.98 | $TiO_2$ | 1.20 |
| $Fe_2O_3$ | 5.95 | $H_2O$ | 0.01 |
| $SO_3$ | 2.50 | MgO | 1.38 |

The resulting slurry began to set almost immediately. The slurry was placed into a cubic mold 2 inches on a side and allowed to set into a cube. The increase in compressive strength was as follows:

| Time | Compressive Strength |
|---|---|
| 1 day | 1875 psi |
| 7 days | 2940 psi |
| 28 days | 4280 psi |

I claim:

1. A process of treating an aqueous sludge containing at least one heavy metal species selected from the group consisting of tungsten, cadmium, chromium, strontium, copper, iron, lead, nickel, zinc, molybdenum, tin, magnesium, aluminum, phosphorus, and manganese, to form a solid leach-resistant body, comprising forming a slurry consisting of said sludge, fly ash formed in the combustion of sub-bituminous coal from the Powder River Basin wherein said fly ash is present in an amount effective to form a slurry which will harden into a solid, leach-resistant body, and an initial water content such that the body will have a 7-day compressive strength of at least about 250 psi, and allowing the slurry to harden.

2. The process of claim 1 wherein said solid, leach-resistant body has a 28-day compressive strength of at least about 400 psi.

3. The process of claim 1 or claim 2 wherein said body has a 7-day compressive strength of at least about 1500 psi.

4. The process of claim 3 wherein said body has a 28-day compressive strength of at least about 2500 psi.

5. The process of claim 1 or claim 2 wherein the amount of said fly ash added to said sludge comprises between about 10 and about 70 percent of the weight of said slurry.

6. The process of claim 5 wherein the amount of said fly ash added to said sludge comprises between about 40 and about 60 percent of the weight of said slurry.

7. The process of claim 3 wherein the amount of said fly ash added to said sludge comprises between about 10 and about 70 percent of the weight of said slurry.

8. The process of claim 7 wherein the amount of said fly ash added to said sludge comprises between about 40 and about 60 percent of the weight of said slurry.

9. The process of claim 4 wherein the amount of said fly ash added to said sludge comprises between about 10 and about 70 percent of the weight of said slurry.

10. The process of claim 9 wherein the amount of said fly ash added to said sludge comprises between about 40 and about 60 percent of the weight of said slurry.

11. The process of claim 1 or claim 2 wherein the initial liquid content of said slurry comprises between about 10 and about 30 percent of the weight of said slurry.

12. The process of claim 3 wherein the initial liquid content of said slurry comprises between about 10 and about 30 percent of the weight of said slurry.

13. The process of claim 4 wherein the initial liquid content of said slurry comprises between about 10 and about 30 percent of the weight of said slurry.

14. A solid, leach-resistant body made in accordance with the process of claim 1 or claim 2.

15. A solid, leach-resistant body made in accordance with the process of claim 5.

16. A solid, leach-resistant body prepared in accordance with claim 11.

* * * * *

REEXAMINATION CERTIFICATE (525th)

United States Patent [19]

Styron

[11] B1 4,226,630

[45] Certificate Issued Jun. 24, 1986

[54] LEACH-RESISTANT SOLID BODIES FROM FLY ASH AND HEAVY METAL SLUDGE

[75] Inventor: Robert W. Styron, Marietta, Ga.

[73] Assignee: Amax Resource Recovery Systems, Inc., Atlanta, Ga.

Reexamination Request:
No. 90/000,587, Jul. 2, 1984

Reexamination Certificate for:
Patent No.: 4,226,630
Issued: Oct. 7, 1980
Appl. No.: 26,492
Filed: Apr. 3, 1979

[51] Int. Cl.$^4$ ............................................. C04B 7/28
[52] U.S. Cl. ..................................... 106/85; 106/109; 106/DIG. 1; 210/751
[58] Field of Search ................... 106/85, 109, DIG. 1; 210/751

[56] References Cited

U.S. PATENT DOCUMENTS

| | | | |
|---|---|---|---|
| 3,634,115 | 1/1972 | Minnick | 106/85 |
| 3,785,840 | 1/1974 | Minnick et al. | 106/118 |
| 3,859,799 | 1/1975 | Jaco, Jr. | 61/35 |
| 4,028,130 | 6/1977 | Webster et al. | 106/120 |
| 4,116,705 | 9/1978 | Chappell | 106/90 |
| 4,124,405 | 11/1978 | Quienot | 106/111 |
| 4,209,335 | 6/1980 | Katayama et al. | 106/89 |
| 4,210,457 | 7/1980 | Dodson et al. | 106/97 |
| 4,230,568 | 10/1980 | Chappell | 210/751 |
| 4,313,762 | 2/1982 | Pound | 106/85 |

OTHER PUBLICATIONS

Quilici, F. J., *Characteristics And Uses Of Montana Fly Ash*, Bulletin 90, Montana Bureau of Mines and Geology (1973).

Helms, R. B., Keefer, G. B. and Sack, W. A., *Environmental Aspects Of Compacted Mixtures Of Fly Ash And Wastewater Sludge*, 48th Annual Conference of Water Pollution Control Federation, Session No. 16, Oct. 7, 1975; Miami Beach, Florida.

Wisniewski, R., *Process Converts Sludge To Landfill*, No Publisher, No date of Publication.

Chemfix Process Brochure, No Title, No Publisher, No Date of Publication.

Dravo Corporation, *FGD Sludge Fixation And Disposal*, No Publisher, No Date of Publication.

IU Conversion Systems, *Poz-O-Tec Brochure*, No Publisher, No Date of Publication.

Duquesne Light Company, *Reclaimed Solid Waste Converted*, Duquesne Light News (1976).

Chappell, C. L. and Willetts, S. L., *Isolation Of Heavy Metals From The Environment*, Conference Proceedings, Management Control Heavy Metal Environment (1979).

*Primary Examiner*—William R. Dixon, Jr.

[57] ABSTRACT

Solid, leach-resistant bodies are formed from aqueous heavy metal sludge and fly ash formed in the combustion of subbituminous coal from the Power River Basin by slurrying the sludge with an amount of fly ash equivalent to between about 20 wt. % and about 70 wt. % based on the weight of the slurry, wherein the initial liquid content of the slurry is such that the slurry will harden into a body having a 7-day compressive strength of at least about 250 psi, and allowing the slurry to harden.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-16 is confirmed.

* * * * *